(12) United States Patent
Athreya et al.

(10) Patent No.: US 11,551,592 B2
(45) Date of Patent: Jan. 10, 2023

(54) DISPLAYS WITH PIXELS COUPLED BY BEAM SPLITTERS

(71) Applicant: Hewlett-Packard Development Company, L.P., Spring, TX (US)

(72) Inventors: Madhu Sudan Athreya, Palo Alto, CA (US); Helen Ann Holder, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/418,975

(22) PCT Filed: Apr. 24, 2019

(86) PCT No.: PCT/US2019/028958
§ 371 (c)(1),
(2) Date: Jun. 28, 2021

(87) PCT Pub. No.: WO2020/219039
PCT Pub. Date: Oct. 29, 2020

(65) Prior Publication Data
US 2022/0114927 A1   Apr. 14, 2022

(51) Int. Cl.
*G09G 3/00* (2006.01)
*H04N 9/31* (2006.01)

(52) U.S. Cl.
CPC ............ *G09G 3/002* (2013.01); *H04N 9/3194* (2013.01); *G09G 2300/04* (2013.01); *G09G 2340/14* (2013.01)

(58) Field of Classification Search
CPC ...... H04N 7/144; H04N 5/2254; G09G 3/002; G09G 3/3208; G06F 1/1639;
(Continued)

(56) References Cited

U.S. PATENT DOCUMENTS 9,468,094 B2   10/2016  Kim et al.
2015/0187828 A1   7/2015  Salsman
(Continued)

FOREIGN PATENT DOCUMENTS

CN    106920470    7/2017
EP     3373563    9/2018
(Continued)

OTHER PUBLICATIONS

Fedewa, Joe "Samsung shows off an under-display camera—no notch needed", Oct. 19, 2018 , Samsung.
(Continued)

*Primary Examiner* — Priyank J Shah
(74) *Attorney, Agent, or Firm* — Quarles & Brady LLP (57) ABSTRACT

An example device includes a main display panel that includes a main array of pixels and an opening within the main array of pixels. The example device further includes a beam splitter positioned to communicate light through the opening within the main array of pixels, a sensor positioned with respect to the beam splitter to capture light incident on the opening within the main array of pixels, and a subarray including a pixel. The subarray is positioned with respect to the beam splitter to output light through the opening within the main array of pixels.

12 Claims, 12 Drawing Sheets

(58) Field of Classification Search
CPC .. G06F 1/1641; G06F 1/1686; H04M 1/0264; H01L 27/3225
See application file for complete search history.

(56) References Cited

U.S. PATENT DOCUMENTS

| | | |
|---|---|---|
| 2015/0271392 A1 | 9/2015 | Musgrave et al. |
| 2017/0084231 A1 | 3/2017 | Chew |
| 2017/0086308 A1* | 3/2017 | Large ................ G02B 5/045 |
| 2018/0331086 A1 | 11/2018 | Chang et al. |
| 2019/0384360 A1* | 12/2019 | Tang .................. H04M 1/02 |
| 2019/0393280 A1* | 12/2019 | Gao .................. G02F 1/1333 |
| 2020/0034100 A1* | 1/2020 | Fan .................. H01L 27/3244 |
| 2020/0234634 A1* | 7/2020 | Li .................... G09G 3/3208 |

FOREIGN PATENT DOCUMENTS

| | | | | |
|---|---|---|---|---|
| WO | WO-2009132145 | | 10/2009 | |
| WO | WO-2019062141 A1 * | 4/2019 | .......... | G02F 1/1335 |
| WO | WO-2019062146 A1 * | 4/2019 | .......... | G02F 1/1333 |
| WO | WO-2019062213 A1 * | 4/2019 | .......... | G02F 1/1333 |

OTHER PUBLICATIONS

Purcher, Jack "Apple Invents a Wild New Display that could conceal a Camera, Strobe Flash and/or Fingerprint Scanner until Needed", May 30, 2013 , Apple.

* cited by examiner

DISPLAYS WITH PIXELS COUPLED BY BEAM SPLITTERS

BACKGROUND

Computing devices, such as notebook computers and smartphones, often have cameras placed near their displays. A camera may be aimed towards the viewer of the display to allow the viewer to take a picture of him/herself, participate in a video call, or use a similar function of the computing device. This type of camera may be called a front-facing camera.

DETAILED DESCRIPTION

A camera may take up physical space on a computing device. For example, a bezel adjacent a computing device's display may be sized to accommodate a front-facing camera. In another example, a display device may be specially shaped, such as with a notch, to accommodate a front-facing camera. These solutions may reduce the attractiveness of the computing device or make the computing device larger (e.g., by way of a wider bezel).

A camera or other light-based sensor may be placed behind a main display panel. This removes the camera as a constraint for bezel size and avoids a notch in the main display panel to accommodate the camera.

The main display panel includes opening through which a camera captures images. A beam splitter is positioned between the camera and the front glass/film of the main display panel. A pixel subarray is positioned to emit light to the beam splitter to "fill in" a pixel or pixels removed from the main display panel to create the opening. The subarray may be a small panel that is arranged perpendicular to the main display panel.

An image to be displayed may be segmented into a main image for the main display panel and a sub-image for the subarray. Image adjustment, such as scaling and artifact correction, may be applied to the sub-image to compensate for image irregularities that may be caused by the different geometry of the pixel subarray and the segmentation process.

Figure 1:
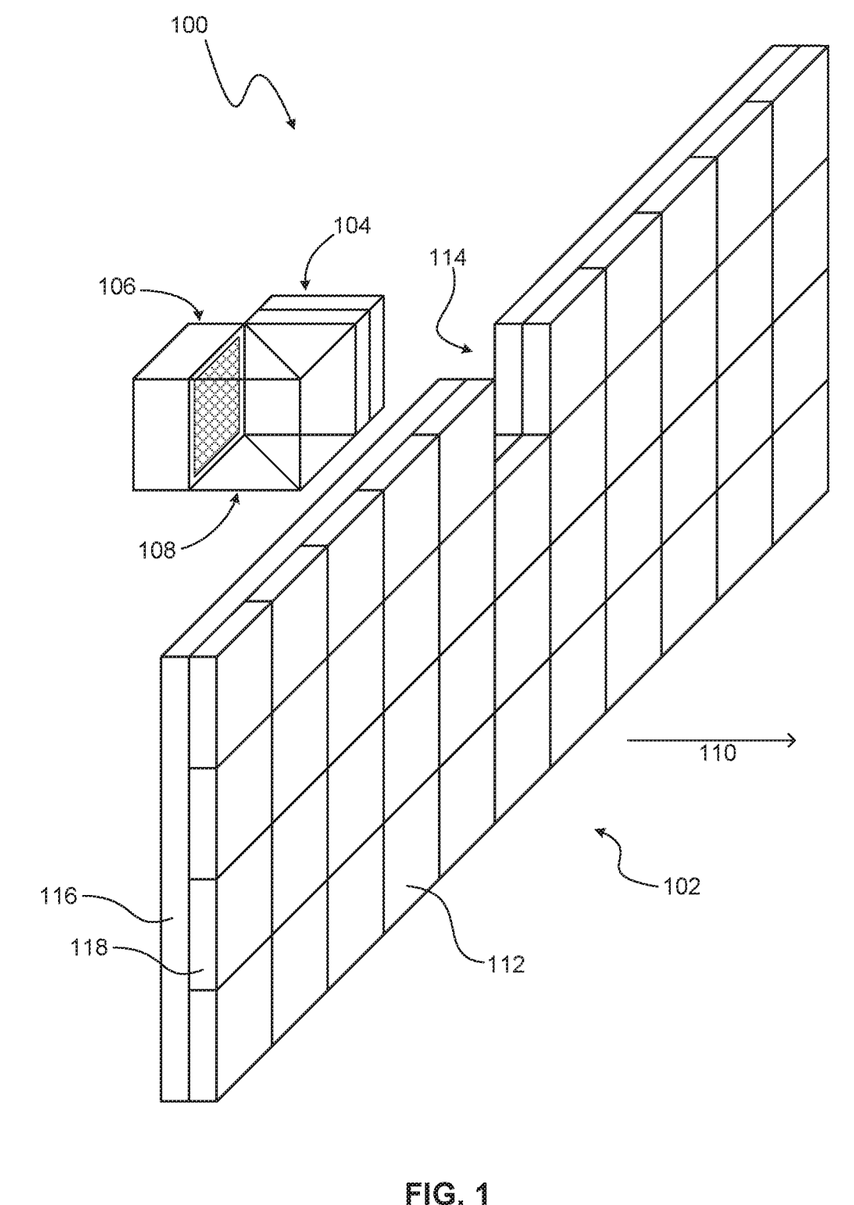
FIG. 1 is perspective view of an example display device with a pixel subarray coupled to a beam splitter at an opening in a main display panel.

FIG. 1 shows an example display device 100. The display device 100 may be used in a display screen of a computing device, such as a notebook computer, desktop computer, tablet computer, smartphone, smartwatch, and the like.

The display device 100 includes a main display panel 102, a pixel subarray 104, a sensor 106, and a beam splitter 108. The pixel subarray 104 is positioned behind the main display panel 102 with respect to a facing direction 110 of the main display panel 102. The pixel subarray 104, the sensor 106, and the beam splitter 108 may be considered an interstitial display relative to the main display panel 102.

The main display panel 102 includes a main array of pixels 112. The main array may be a rectangular array of pixels 112. An opening 114 is provided within the main array of pixels 112. The opening 114 may be formed by removal of a pixel from the main array. The opening 114 may have any suitable shape and size. Any number of adjacent pixels 112 may be removed to form the opening 114. The size of the opening 114 may be determined by the size of the sensor 106 and the number and pixels removed to form the opening 114 may be determined accordingly. In one example, four pixels may be removed. In other examples, 1, 16, 64, 256, or 4096 pixels may be removed.

The pixel subarray 104 is positioned with respect to the beam splitter 108 to output light through the opening 114 within the main array of pixels 112. The pixel subarray 104 may be positioned orthogonal to the main array of pixels 112. The beam splitter 108 may be aligned with the opening 114 to direct light emitted by the pixel subarray through the opening and generally in the same direction 110 as light emitted by the array of pixels 112.

The pixel subarray 104 may contain any number of pixels and may have any suitable shape and size. In various examples, the pixel subarray 104 corresponds directly to the number and arrangement of pixels 112 omitted or removed from the main display panel 102 to provide the opening 114. For example, when four rectangularly arranged pixels 112 at given horizontal and vertical pitches are removed from the main array, the pixel subarray 104 may include four rectangularly arranged pixels at the same horizontal and vertical pitches. In another example, the pixel subarray 104 includes a single pixel.

An example pixel 112 for the main array or subarray may include a substrate 116 and a light-emissive component 118. Pixels 112 may share a substrate. The light-emissive component 118 may include a light-emitting diode (LED) or set of LEDs. An electrode may be provided to the light-emissive component 118 to energize the light-emissive component 118 to emit light. In various examples, the light-emissive component 118 may include a set of LEDs that emit different colors, such as red, green, and blue, at controllable intensities or duty cycles to cause the light-emissive component 118 to be viewed as a specific color. A pixel 112, may be a micro-LED pixel.

The sensor 106 is to sense light coming through the opening 114 within the main array of pixels 112. The sensor 106 is positioned with respect to the beam splitter 108 to capture light incident on the opening 114. That is, light may enter the opening in a direction generally opposite the display device's light emission direction 110, pass through the beam splitter 108, and illuminate the sensor 106. The sensor 106 may include an image sensor. The sensor 106 may include a camera, such as a camera that may include an image sensor and a glass cover or related optics. Example image sensors include a charge-coupled device (CCD), a complementary metal-oxide-semiconductor (CMOS) device, an N-type metal-oxide-semiconductor (NMOS) device, and similar. In other examples, the sensor 106 may include a photoresistors, photodiode, phototransistor, or similar. A camera used as the sensor 106 may be a low-light camera to compensate for reduced incident light due to the beam splitter 108.

The sensor 106 may be a front-facing camera of a mobile computing device, such as a smartphone or notebook computer. A user may look at the display device 100 in a direction generally opposite the display direction 110. The camera may then be used to capture an image of the user and/or surrounding scenery. As such, the camera may implement the capture of still images or video to facilitate various functions of a mobile computing device, such as ordinary photography, video recording, video calls, or similar.

The sensor 106 may be implemented for other purposes, such as an ambient light sensing, proximity sensing, fingerprint sensing, or similar.

The beam splitter 108 is positioned to communicate light through the opening 114 within the main array of pixels 112. The beam splitter 108 may be positioned near or in the opening 114 and in alignment with the opening 114. The beam splitter 108 may be cubic in shape. The beam splitter 108 may have any suitable ratio of reflection to transmission.

In various examples, as depicted, the sensor 106 is aligned with the transmissive axis of the beam splitter 108, which may be aligned with the facing direction 110 of the panel 102. Light entering the opening 114 is transmitted by the beam splitter 108 and shines onto the sensor 106. In such examples, the pixel subarray 104 is aligned with the reflective axis of the beam splitter 108, which may be orthogonal to the facing direction 110 of the panel 102. Light emitted by the pixel subarray 104 is reflected by the beam splitter 108 and is emitted in the facing direction 110 of the panel 102.

In other examples, the positions of the sensor 106 and pixel subarray 104 may be reversed. The sensor 106 may be aligned with the reflective axis of the beam splitter 108 and the pixel subarray 104 may be aligned with the transmissive axis of the beam splitter 108.

In an example operation, an image to be displayed by the display device 100 is segmented into a main image for the main display panel 102 and a sub-image for the pixel subarray 104. The main image is directly emitted by the main array of pixels 112. The sub-image is emitted by the pixel subarray 104, reflected by the beam splitter 108, and emitted through the opening 114, so as to appear as expected in the context of the main image. The pixel subarray 104 may be driven at an intensity that compensates for losses due to the beam splitter 108. The sub-image and main image are recombined in place to reproduce the image intended to be displayed. The sensor 106 may be controlled to capture light entering the display device 100 through the opening 114. Light capture by the sensor 106 may be coordinated with respect to the display of the sub-image by the pixel subarray 104. For example, the pixel subarray 104 may be temporarily turned off, at which time the sensor 106 may be used to capture, through the opening, an image or light for another purpose.

Figure 2A:
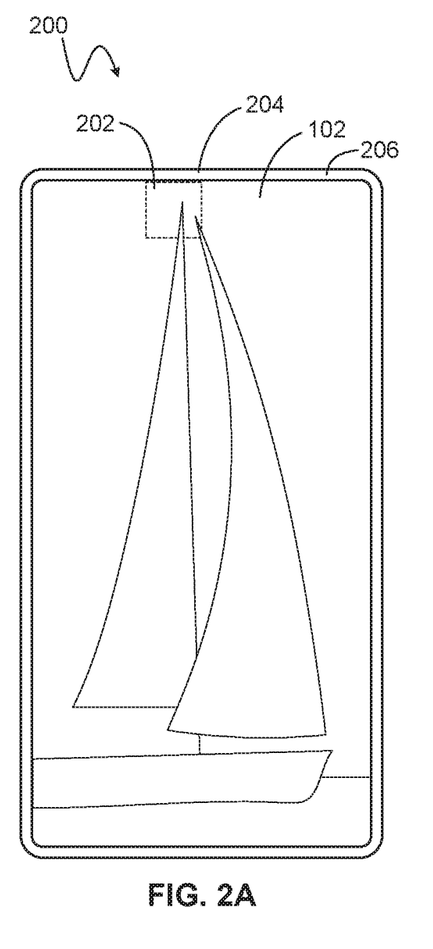
FIG. 2A is a front view of an example computing device with a pixel subarray activated to display a portion of an image via a beam splitter.
Figure 2B:
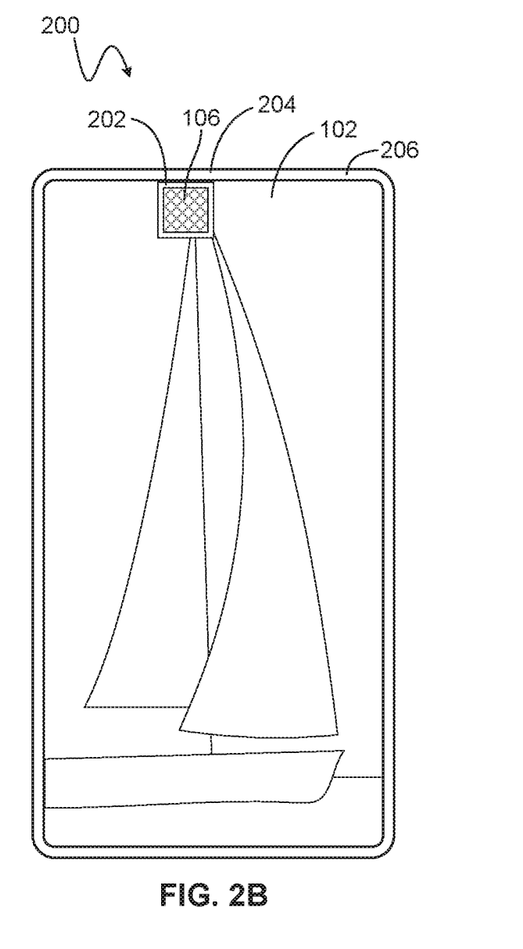
FIG. 2B is a front view of the example computing device of FIG. 2A with the pixel subarray deactivated.

FIGS. 2A and 2B show an example computing device 200 that includes a main display panel 102 and an interstitial display 202 that includes a pixel subarray, a beam splitter, and a sensor, as described elsewhere herein, such as with respect to FIG. 1. The interstitial display 202 is optically coupled to the main display panel 102 by the beam splitter. The computing device 200 further includes a housing 204. A bezel 206 may exist between and outward extent of the housing and the main display panel 102.

In FIG. 2A, the pixels of the interstitial display 202 are active to display a sub-image in context with a main image that is displayed by the main display panel 102 to show an overall, complete image.

In FIG. 2B, the pixels of the interstitial display 202 are inactive. A missing portion of the image displayed by the main display panel 102 may be apparent to the user. The sensor 106 may be visible to the user. As such, the user may be made aware that the sensor 106 may be active.

Use of the interstitial display 202 to provide a camera or other sensor may reduce or eliminate the need for a permanent space on the bezel 206 to accommodate the camera or other sensor. A large bezel 206 or a notch in the main display panel 102 may be avoided. The interstitial display 202 may allow the bezel size to be minimized. The interstitial display 202 may allow the main display panel 102 to be a generally rectangular shape without a notch or other permanently non-displaying feature. The visibility interstitial display 202 when its pixel subarray is inactive may be readily apparent to the view and may thus directly inform the viewer that the sensor 106 is active. For example, the appearance of the sensor 106 and/or the disappearance of the co-located portion of the image may be interpreted by the viewer as the device 200 being ready to capture an image or other light-based information.

Figure 3:
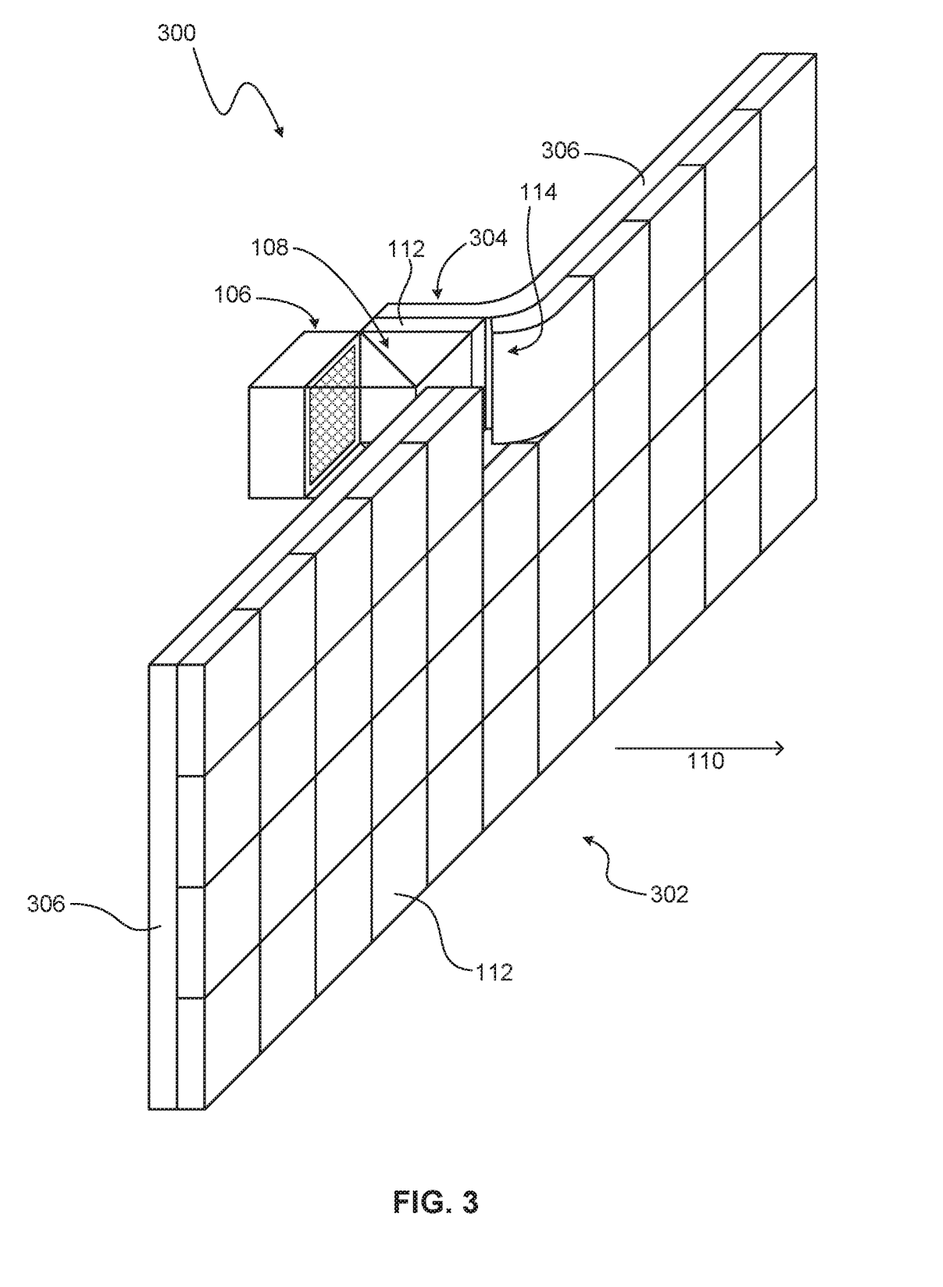
FIG. 3 is perspective view of an example display device with a pixel subarray on a bent substrate to form an opening in a main display panel.

FIG. 3 shows an example display device 300 with a bent pixel subarray. Features and aspects of the display device 300 may be similar or identical to the other display devices described herein. The other display devices described herein may be referenced for description not repeated here, with like reference numerals denoting like components.

The display device 300 includes a main display panel 302 that has a main array of pixels 112. The display device 300 further includes a pixel subarray 304 that is a folded subset of the main array of pixels 112.

A substrate 306 of pixels 112 may be flexible and a portion of the substrate 306 may be folded or bent to aim a pixel 112 of the pixel subarray 304 towards a beam splitter 108. As such, the main array and the subarray 304 may be different regions of the same physical array of pixels 112.

The substrate 306, electrode layer, and/or other layer may be cut to facilitate the folding of the pixel subarray 304. If signal and/or power conductors are also cut, such conductors may be rerouted around the beam splitter 108 and sensor 106.

Figure 4:
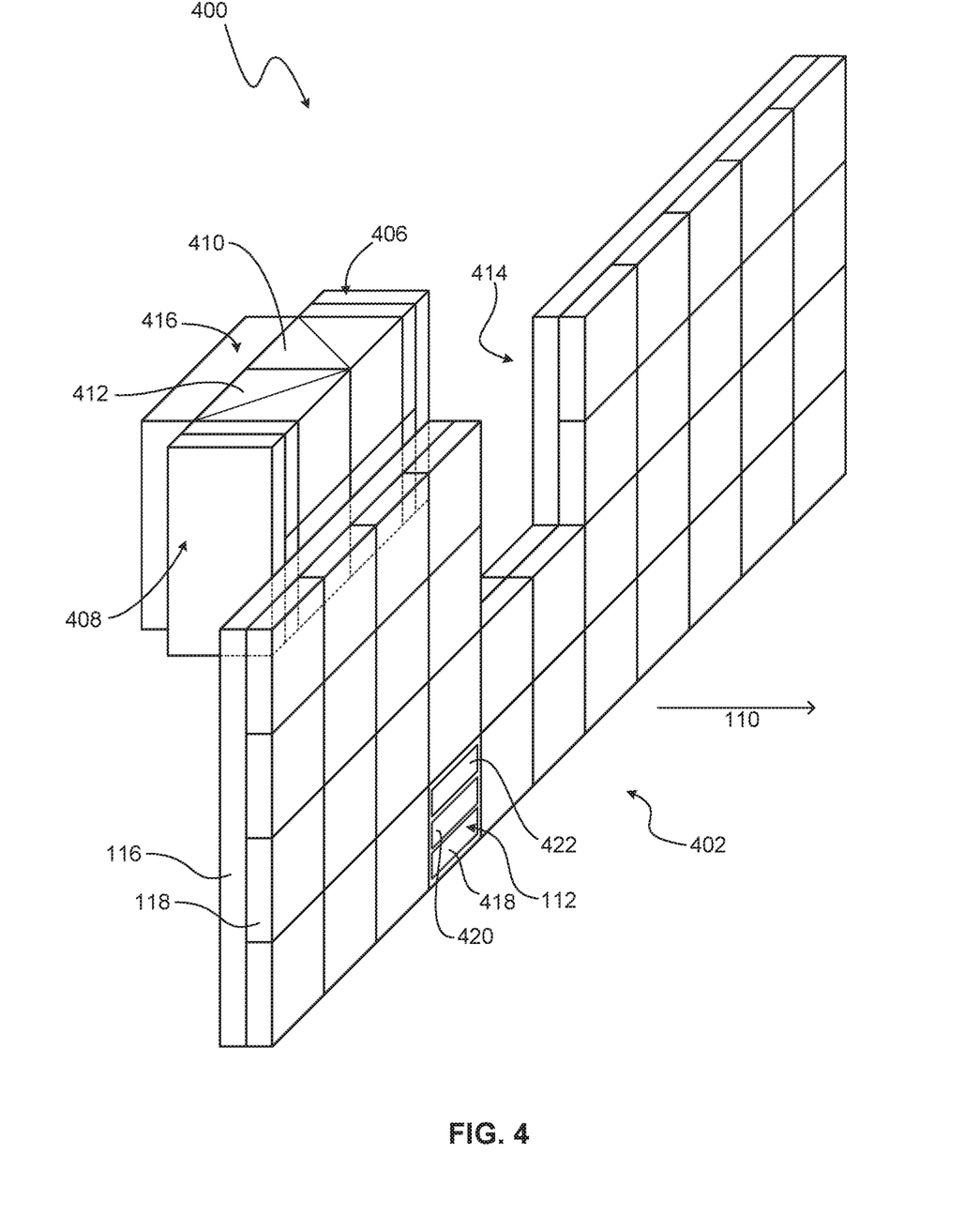
FIG. 4 is perspective view of an example display device with a plurality of pixel subarrays positioned with a plurality of beam splitters at an opening in a main display panel.

FIG. 4 shows an example display device 400 with a plurality of pixel subarrays and a plurality of beam splitters. Features and aspects of the display device 400 may be similar or identical to the other display devices described herein. The other display devices described herein may be referenced for description not repeated here, with like reference numerals denoting like components.

The display device 400 includes a main display panel 402 that has a main array of pixels 112.

The display device 300 further includes a plurality of pixel subarrays. For example, a first subarray 406 and second subarray 408 may be provided. Each subarray 406, 408 may have any number of pixels. In this example, each subarray 406, 408 has two pixels thereby providing a total of four pixels.

A plurality of beam splitters 410, 412 may be provided. In this example, a beam splitter 410, 412 is provided for each pixel of the subarray 406, 408, so that four beam splitters 410, 412 are provided. Each pixel of the subarrays 406, 408 may be aligned with the reflective axes of the respective beam splitter 410, 412. In other examples, a plurality of pixels in a subarray may share a particular beam splitter.

The main display panel 402 includes an opening 414 and the beam splitters 410, 412 are aligned with the opening 414. The opening 414 is shaped and sized to accommodate the pixels of the subarrays 406, 408. The subarray 406, 408 of pixels may be disposed on different sides of the opening 114. In this example, subarrays 406, 408 are situated on opposite sides of the opening 114.

The display device 300 further includes a sensor 416, such as a camera. The sensor 416 may be aligned with the transmissive axes of the beam splitters 410, 412. The number of pixels in the subarrays 406, 408 and the size of the opening 114 in the main display panel 402, as well as the geometry of the subarrays 406, 408 and opening 114, may be selected to accommodate a particular size of sensor 416, In this example, the sensor 416 has a rectangular sensing region that is approximately four pixels in size.

In other examples, a plurality of sensors may be provided, for example, one sensor per beam splitter 410, 412. Different sensors may capture different color channels of light. For example, a different sensor may be provided for each of a red, green, and blue wavelength range.

FIG. 4 also shows example micro-LED elements of an example pixel 112. In this example, each pixel in the main array of pixels 112 and in the subarrays 406, 408 include a red LED 418, a green LED 420, and a blue LED 422. The LEDs 418, 420, 422 may be controlled to emit a range of colors.

Figure 5A:
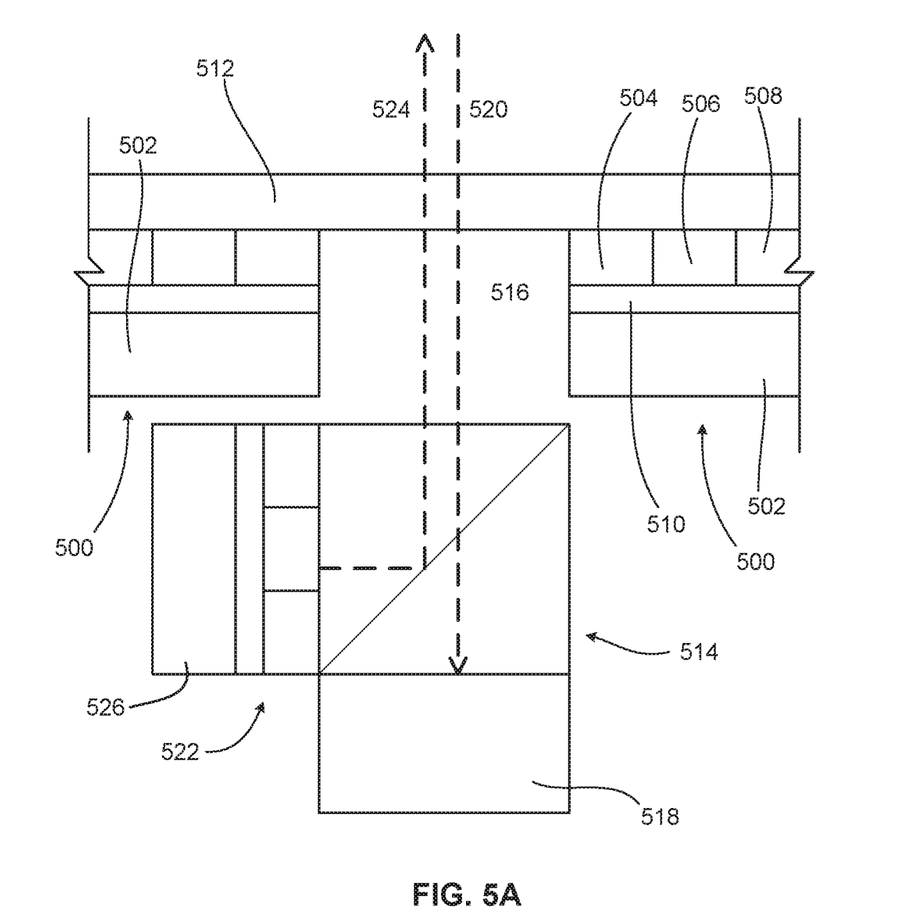
FIG. 5A is a schematic diagram showing example light-emission and light-capture axes, where the light-emission axis is a reflective axis of a beam splitter to which a pixel subarray is aligned.

FIG. 5A. shows example pixels 500 of a main array of pixels. The pixels 500 may have similar or identical structure. The pixels 500 may be disposed on a common substrate 502 and may include light-emitting elements 504, 506, 508 (e.g., red, green, and blue LEDs) and an electrode layer 510 to drive the light emitting elements 504, 506, 508 according to a pixel color signal. A cover layer 512, such as glass, polymer film, or similar, may be provided as common to the pixels 500.

A beam splitter 514 may be positioned at an opening 516 in the main array where a pixel 500 of the main array is not present.

A sensor 518, such as a camera, may be positioned adjacent the beam splitter 514 and aligned with a transmissive axis 520 of the beam splitter 514 to capture light entering the opening 516 along the transmissive axis 520.

A pixel subarray 522 having a pixel may be positioned adjacent the beam splitter 514 and aligned with a reflective axis 524 of the beam splitter 514 to emit light through the opening 516 along the reflective axis 524. The pixel subarray 522 may include a separate substrate 526 to carry its pixels. In other examples, the common substrate 502 carries the pixels of the subarray 522 and the common substrate 502 is folded to align the pixels of the subarray 522 with the beam splitter 514.

The cover layer 512 may be uniform across the pixels 500 of the main array and the pixels of the subarray 522 to provide a consistent appearance.

Figure 5B:
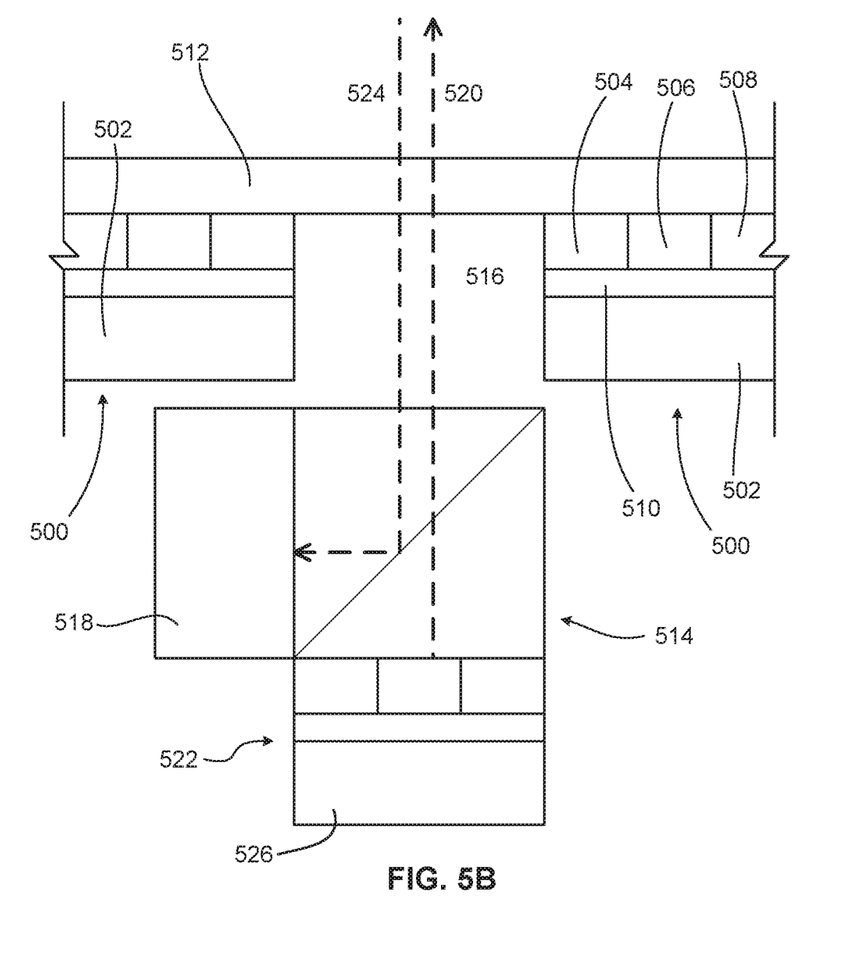
FIG. 5B is a schematic diagram showing example light-emission and light-capture axes, where the light-emission axis is a transmissive axis of a beam splitter to which a pixel subarray is aligned.

FIG. 5B. shows an arrangement similar to FIG. 5A. In this example, a pixel subarray 522 is aligned with a transmissive axis 520 of a beam splitter 514 and a sensor 518, such as a camera, is aligned with a reflective axis 524 of the beam splitter 514.

Figure 6:
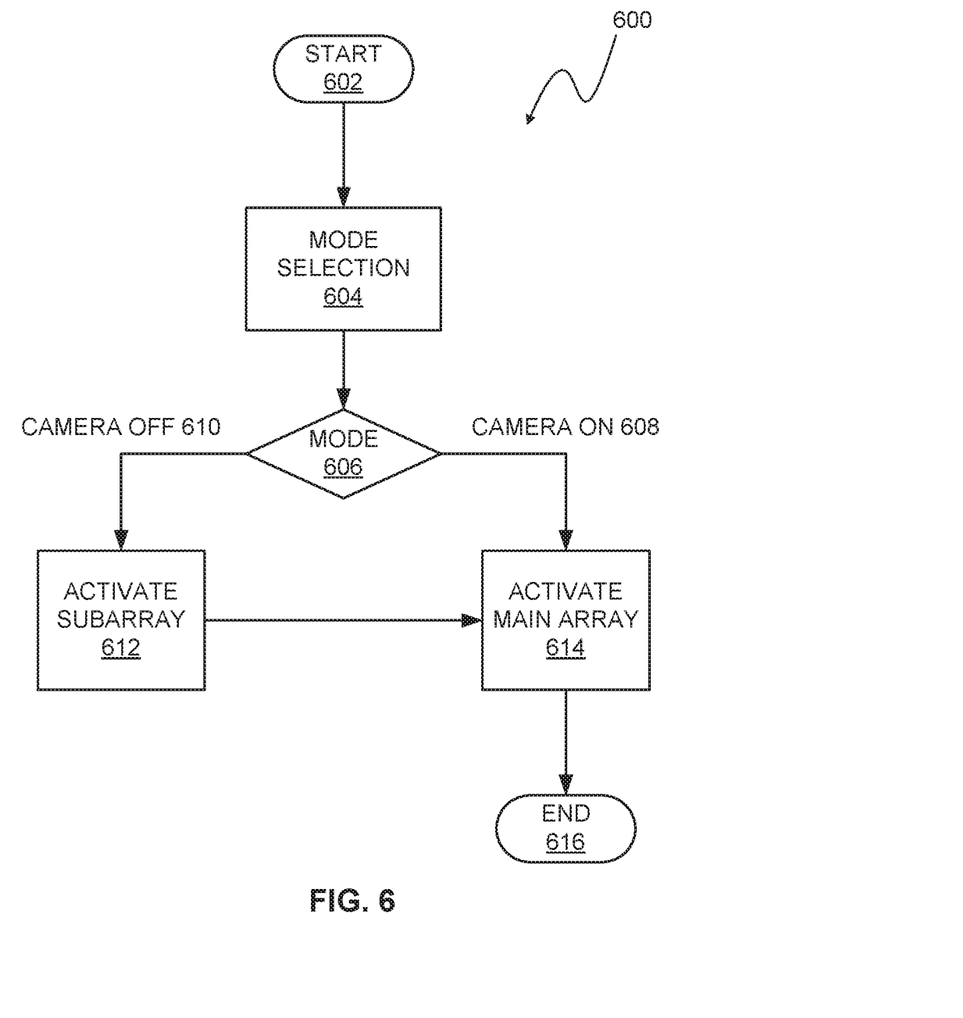
FIG. 6 is a flowchart of an example method of controlling a display device with a pixel subarray coupled to a beam splitter at an opening in a main display panel.

FIG. 6 shows an example method 600 of operating a device that includes a main array of pixels with an opening to accommodate an interstitial display that includes a pixel subarray, a front-facing camera, and a beam splitter. The method 600 may be used with any of the devices described herein. The method starts at block 602.

At block 604, a mode is selected for the device. For example, a user interface of the device may receive user input to activate the camera. In another example, a video call may be accepted, which activates the camera.

At block 606, the selected mode is determined to either active 608 the camera or not activate 610 the camera.

When the camera is not active, the pixel subarray is activated, at block 612. The main array of pixels is also activated, at block 614, so that a full image may be displayed at the device.

When the camera is active, the main array of pixels is also activated, at block 614 without activating the pixel subarray. As such, the displayed image contains an empty region. The camera may then be used to capture an image. The empty region and/or the visibility of the camera may let the user know that the camera is operational and may serve the same function as a privacy LED.

The method 600 ends at block 616. The method 600 may be repeated continually as the device is in use or may be triggered by particular application, such as a camera app, being opened on the device.

Figure 7:
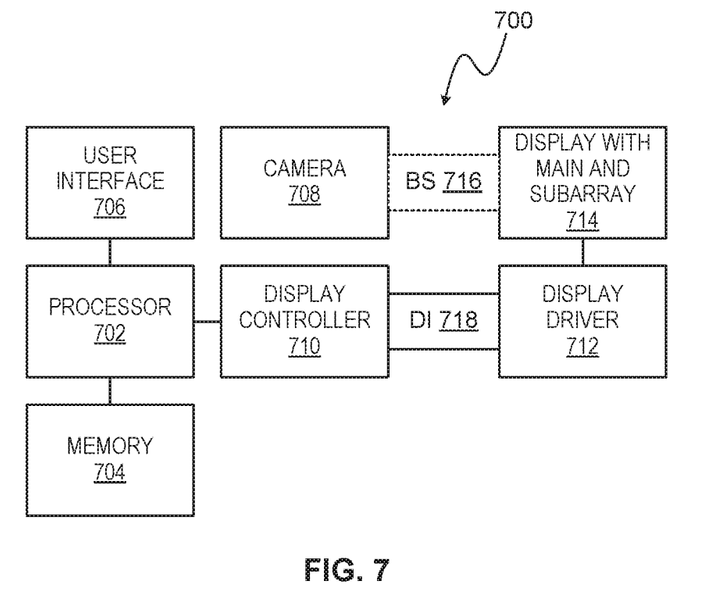
FIG. 7 is a block diagram of an example computing device including a main array of pixels, a pixel subarray, and a beam splitter.

FIG. 7 shows an example computing device 700 having a display with main and subarrays of pixels cooperating through a beam splitter. The computing device 700 may be a notebook computer, desktop computer, tablet computer, smartphone, smartwatch, or similar.

The computing device 700 includes a processor 702, memory 704, a user interface 706, a camera 708, a display controller 710, a display driver 712, a display device 714, and a beam splitter 716.

The processor 702 may include a central processing unit (CPU), a microcontroller, a microprocessor, a processing core, a field-programmable gate array (FPGA), or a similar device capable of executing instructions. The processor 702 may cooperate with the memory 704 to execute instructions that may be stored in the memory 704. The memory may include a non-transitory machine-readable medium that may be an electronic, magnetic, optical, or other physical storage device that encodes executable instructions. The machine-readable medium may include, for example, random access memory (RAM), read-only memory (ROM), electrically-erasable programmable read-only memory (EEPROM), flash memory, a storage drive, an optical disc, or similar.

The user interface 706 may include a button, keypad, keyboard, touchscreen elements of the display device 714, a microphone, a speaker, or similar.

The camera 708 is positioned at an opening in the display device 714, as described elsewhere herein, in cooperation with the beam splitter 716. The camera 708 may be a front-facing camera.

The display controller 710 may include an integrated circuit that controls operations of the display device 714.

The display driver 712 may drive hardware of the display device 714 to emit light via pixels of the display device 714. The display driver 712 may be connected to the display controller 710 by a display interface 718.

The display interface 718 communicates image information, such as pixel data, from the display controller 710 to the display driver 712. The display interface 718 may conform to a standard, such as High-Definition Multimedia Interface (HDMI), DisplayPort (DP), Low-Voltage Differential Signaling (LVDS), Mobile Industry Processor Interface (MIPI) Display Serial Interface (DSI), or similar.

The display device 714 includes a main array of pixels and a pixel subarray. The subarray is optically coupled to the main array via the beam splitter 716. The subarray may be activated independently from the main array to selectively contribute to the image displayed by the main array. The subarray may be deactivated to give the camera 708 a clear view through the beam splitter 716. The pixel subarray, beam splitter 716, and camera 708 may be arranged and/or controlled as discussed elsewhere herein.

The display controller 710 segments an image or frame to be displayed at the display device 714 into a main image corresponding to the main array of pixels and a sub-image corresponding to the pixel subarray. The display controller 710 may then independently adjust one or both of the main image and sub-image to compensate for irregularities that may result from the geometry of the main and subarrays, the presence of the beam splitter 716, or other factors. For example, the beam splitter 716 may introduce noise to the sub-image and the display controller 710 may compensate for such noise. The display controller 710 may scale the sub-image. The display controller 710 may recomposite the main image and sub-image an output the recomposited image to the display driver 712 via the display interface 718.

The display driver 712 segments the image received through the display interface 718 into a main image and a sub-image. The display driver 712 then provides the main image to the main array of pixels and provides the sub-image to the pixel subarray of the display device 714. Segmentation and compositing by the display controller 710 and then re-segmentation by the display driver 712 may avoid the need to modify the display interface 718 in a way that could violate the display interface standard implemented.

Figure 8:
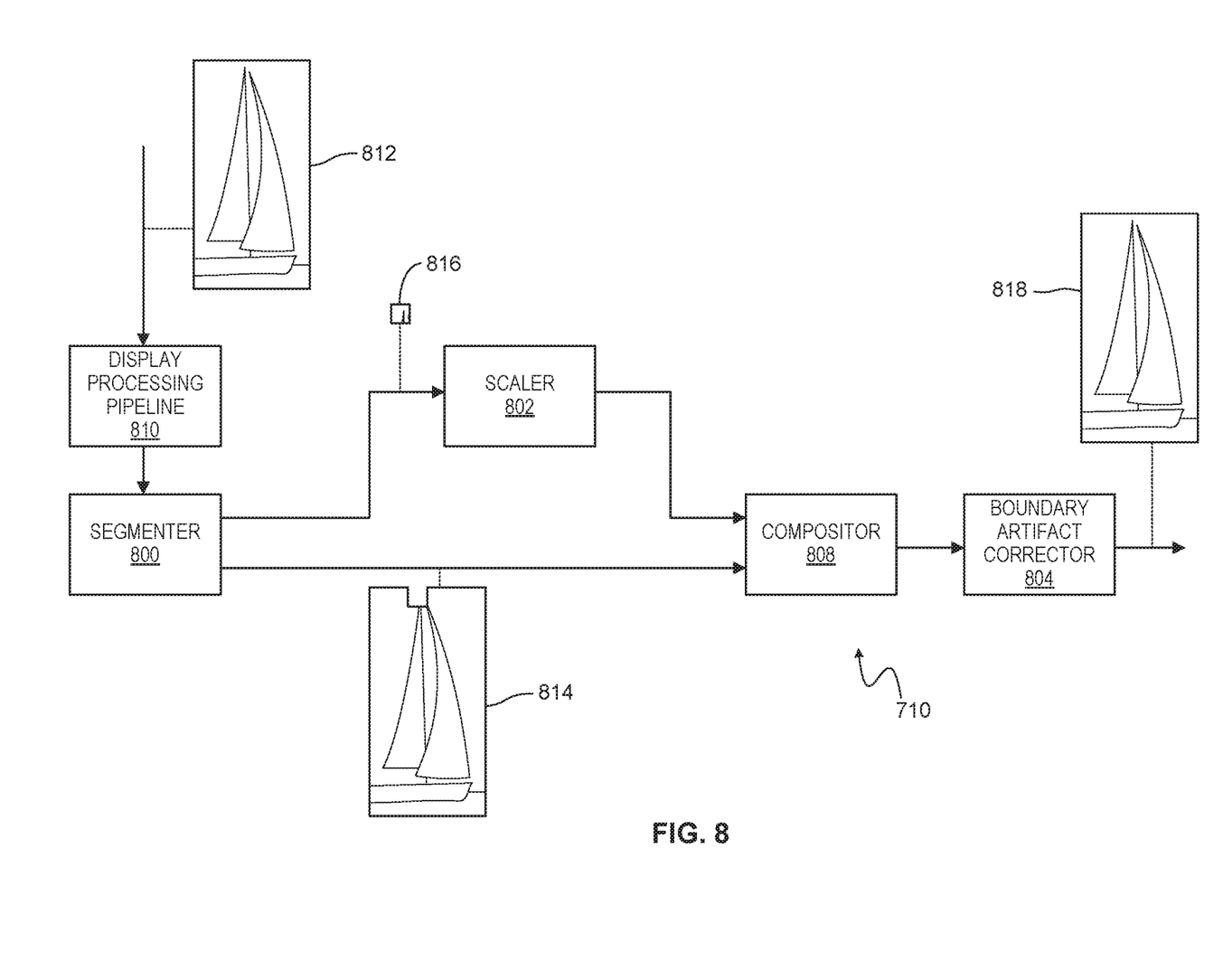
FIG. 8 is a block diagram of an example display controller to segment, adjust, and composite an image for display at a main array of pixels and a subarray.

FIG. 8 shows an example display controller 710.

The display controller 710 may include a segmenter 800, a scaler 802, a boundary artifact corrector 804, and a compositor 808. An image processing path for a main image may extend from the segmenter 800 directly to the compositor 808. An image processing path for a sub-image may include the scaler 802. Both such paths may begin at the segmenter 800 and end at the boundary artifact corrector 804. The display controller 710 may receive an image through a display processing pipeline 810.

The segmenter 800 segments a received image 812 into a main image 814 and a sub-image 816 based on the relative sizes and positions of a main array of pixels and a pixel subarray positioned to emit light through an opening of the main array. Pixels extracted from the main image 814 to form the sub-image 816 may remain in the main image 814. The depicted cutout is for explanatory purposes.

The scaler 802 scales the sub-image 816. The scaler 802 may scale the sub-image according to a function of a resolution of the main display panel and a physical size of the opening in the main display panel. For example, the subarray contains a fixed number and arrangement of pixels capable of displaying the sub-image 816. The sub-image 816 may thus be scaled to match the size of the opening in the main display panel and the resolution of the main display panel, as closely as practical. When the subarray and main array have matching resolution and when the subarray matches the size of the opening, scaling may not be required or may be performed at a factor of unity.

Adjustment of the sub-image 816 and main image 814 may be performed independently. Different adjustments, including no adjustment, may be made for each of the sub-image 816 and the main image 814. In this example, no adjustment is made to the main image 814.

The compositor 808 recomposites the main image 814 and the sub-image 816, after adjustment performed by the scaler 802. That is, the compositor 808 combines the sub-image 816, as may be adjusted, with the main image 814, as may be adjusted, to form a composited image of the same resolution and size as the received image 812.

The composited image is provided to the boundary artifact corrector 804 to correct boundary artifacts, as may arise due to the segmenting, scaling, and/or the optical arrangement. Boundary artifact correction may increase uniformity of the image. A gradient filter may be applied across a boundary between the main and sub-image parts of the composited image. The boundary artifact corrector 804 outputs a subarray-adjusted image 818 to the display driver 712, via the display interface 718, shown in FIG. 7. Outputting a recomposited image 818, as opposed to the main image and sub-image, may allow the display interface 718 to remain in compliance with the implemented standard.

In other examples, a boundary artifact corrector 804 may be provided to the image processing path for the main image and the image processing path for the sub-image, so that boundary artifact correction is performed prior to re-composition.

Figure 9:
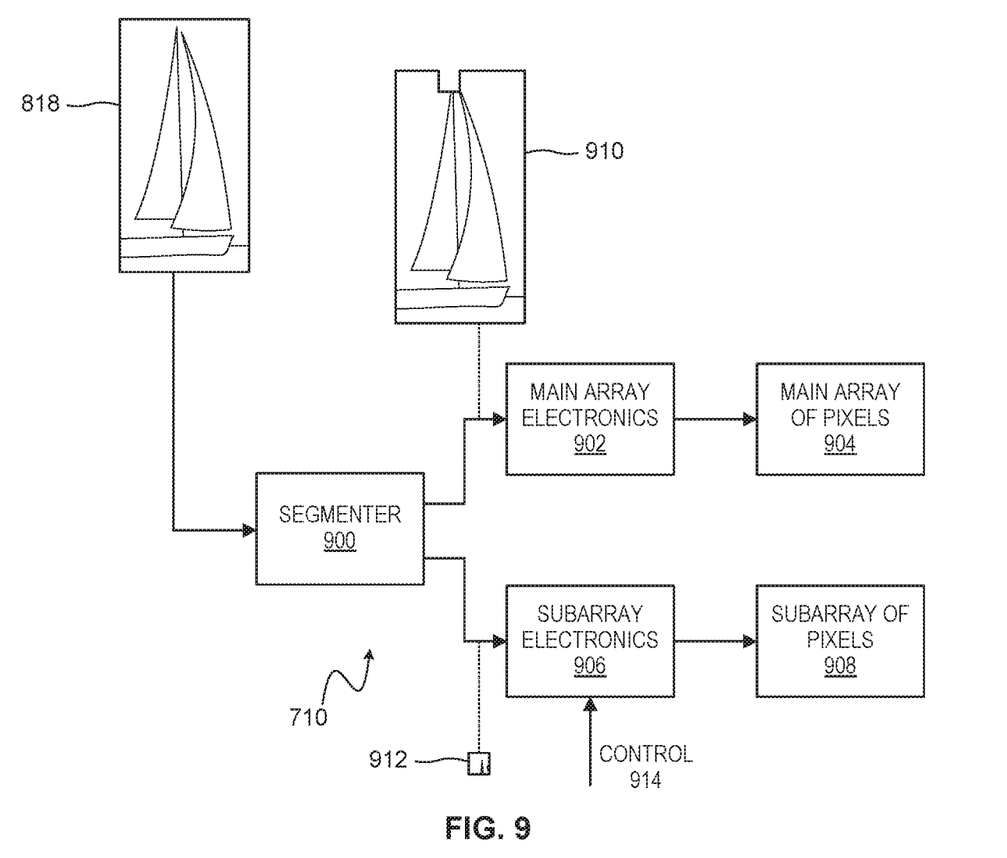
FIG. 9 is a block diagram of an example display driver to segment and output an image at a main array of pixels and a subarray.

FIG. 9 shows an example display driver 712.

The display driver 712 may include a segmenter 900, driving electronics 902 for a main array of pixels 904, and driving electronics 906 for a pixel subarray 908.

The segmenter 900 receives a subarray-adjusted image 818 from the display controller 710 and segments the image 818 into a main image 910 and a sub-image 912. The main image 910 corresponds to the main array of pixels 904 and the sub-image 912 corresponds to the pixel subarray 908. The segmenter outputs the main image 910 to the main driving electronics 902 and outputs the sub-image 912 to the subarray driving electronics 906.

The main driving electronics 902 drive the main array of pixels 904 to display the main image 910. Independent to the main driving electronics 902, the subarray driving electronics 906 selectively drive the pixel subarray 908 to display the sub-image 912 as controlled by a control signal 914, which may be generated by a processor, display controller, or other component of a computing device carrying the display driver 712. The sub-image 912 may thus be controlled to be displayed interstitially with the main image 910, so that a complete image is displayed, and further controlled to stop being displayed, so that a camera or other sensor at the pixel subarray 908 may be used.

The subarray driving electronics 906 may drive the pixel subarray 908 at an intensity that is increased to compensate for losses due to the beam splitter. For example, if the beam splitter has a reflection/transmission (R/T) ratio of 50:50 and the pixels of the main array and subarray are sustainably the same, then the subarray driving electronics 906 may drive the pixel subarray 908 at approximately twice the intensity that the main driving electronics 902 drive the main array of pixels 904.

Figure 10:
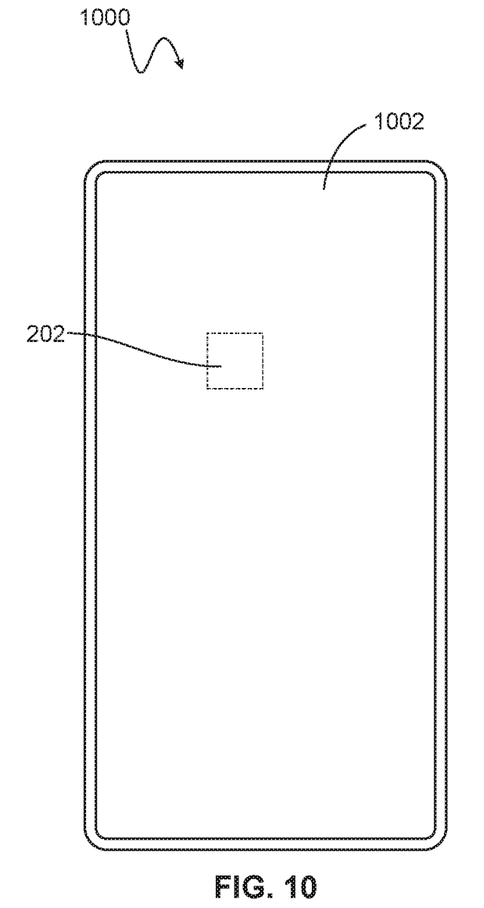
FIG. 10 is a front view of an example computing device with a pixel subarray surrounded by a main array of pixels.

FIG. 10 shows an example computing device 1000 with an interstitial display 202 completely surrounded by pixels of a main display panel 1002. The interstitial display 202 may include a pixel subarray, a beam splitter, and a camera or other sensor, as described elsewhere herein, such as with respect to FIG. 1. Further aspects of the computing device 1000 may be similar or identical to the other devices described herein.

Figure 11:
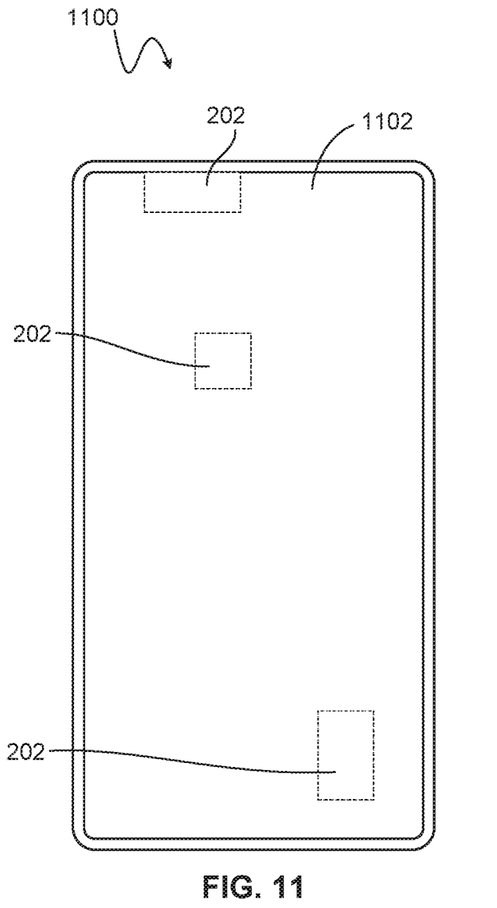
FIG. 11 is a front view of an example computing device with a plurality of separate pixel subarrays.

FIG. 11 shows an example computing device 1100 with a plurality of interstitial displays 202 at different positions within a main display panel 1102. Each interstitial display 202 may include a pixel subarray, a beam splitter, and a camera or other sensor, as described elsewhere herein, such as with respect to FIG. 1. Further aspects of the computing device 1100 may be similar or identical to the other devices described herein.

Figure 12:
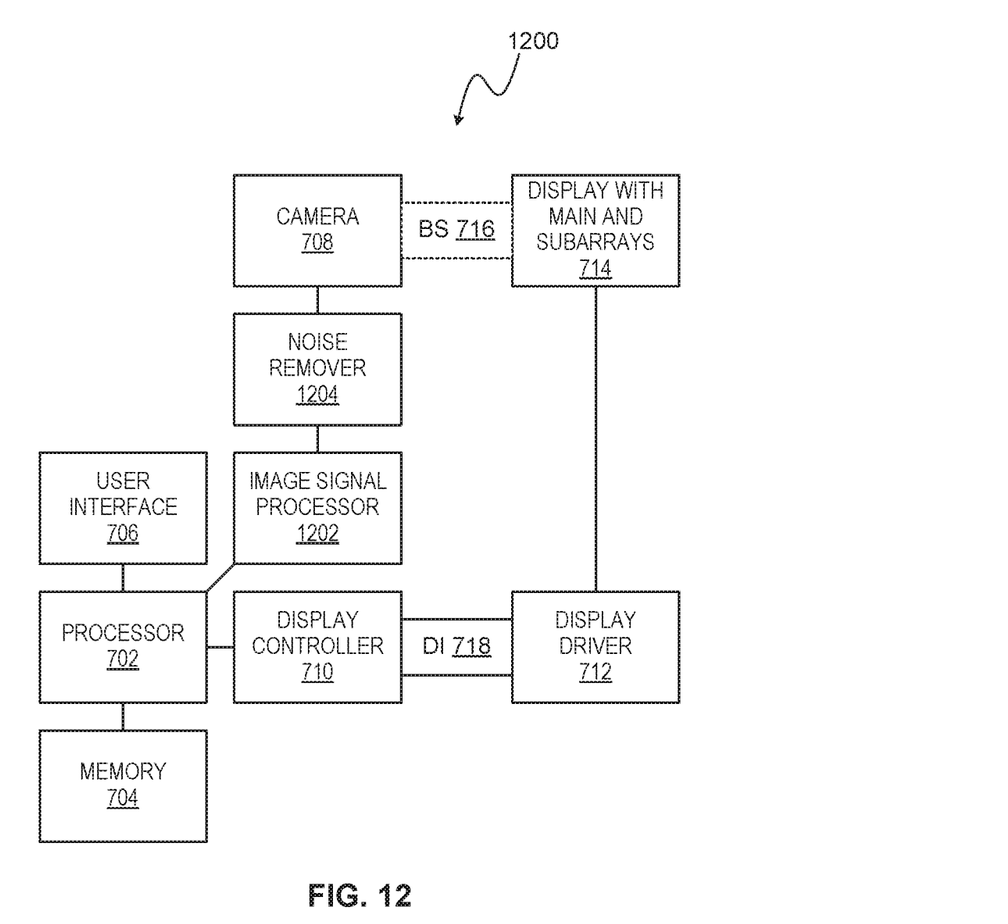
FIG. 12 is a block diagram of an example computing device including noise removal component for a camera positioned at a beam splitter.

FIG. 12 is a block diagram of an example computing device 1200. Features and aspects of the computing device 1200 may be similar or identical to the other computing devices described herein. The other computing devices described herein may be referenced for description not repeated here, with like reference numerals denoting like components.

The computing device 1200 includes an image signal processor 1202 and a noise remover 1204 connected between a camera 708 and a processor 702.

Image signal processor 1202 is to process captured image signals into image data that may be stored in memory 704 and operated on by the processor 702.

The noise remover 1204 removes noise from image signals captured by the camera 708. Such noise may be caused by a beam splitter 716 through which the camera 708 captures images. Noise may be apparent as a faint pattern in captured images and may be fixed-pattern noise (FPN). The noise remover 1204 may remove FPN by processing RAW-format Bayer output from the camera 708. This may be considered pre-processing, as the noise remover 1204 is upstream of the image signal processor 1202.

The noise remover 1204 may a separate programmable processor or digital signal processor (DSP). Alternatively, the noise remover 1204 may be part of the image signal processor 1202.

In other examples, the noise remover 1204 is part of the image signal processor 1202 or is downstream of the image signal processor 1202. The noise remover 1204 may then operate according to a post-processing methodology and, for example, process YUV (luminance/chrominance) data generated the image signal processor 1202. Alternatively or additionally, the noise remover 1204 may be implemented as instructions executable by the processor 702.

In view of the above it should be apparent that camera or other sensor may be hidden behind a display device and selectively activated to capture images or other information. A bezel need not be sized to accommodate the camera or other sensor. Further, a static notch need not be provided in the display device to accommodate the camera or other sensor.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A device comprising:
a main display panel, the main display panel including a main array of pixels and an opening within the main array of pixels;
a beam splitter positioned to communicate light through the opening within the main array of pixels;
a sensor positioned with respect to the beam splitter to capture light incident on the opening within the main array of pixels;
a subarray including a pixel, the subarray positioned with respect to the beam splitter to output light through the opening within the main array of pixels;
a display controller to segment an image into a main image corresponding to the main array and a sub-image corresponding to the subarray, the display controller further to scale the sub-image.

2. The device of claim 1, wherein the subarray is orthogonal to the main array.

3. The device of claim 1, wherein the subarray includes a folded subset of the main array of pixels.

4. The device of claim 1, wherein the sensor comprises a camera.

5. The device of claim 1, further comprising a display driver to segment an image into a main image and a sub-image, provide the main image to the main array, and provide the sub-image to the subarray.

6. The device of claim 1, wherein the main array and the subarray include micro light-emitting diode (micro-LED) pixels.

7. The device of claim 1, wherein the sensor includes a camera and wherein the display controller is to scale the sub-image according to a function of a resolution of the main display panel and a size of the opening.

8. The device of claim 1, wherein the display controller is further to adjust one or both of the main image and the sub-image and recomposite the main image and the sub-image into a subarray-adjusted image.

9. The device of claim 8, wherein the display controller is further to correct a boundary artifact in the subarray-adjusted image.

10. A computing device comprising:
a main display panel to display a main image;
an interstitial display coupled to the main display panel by a beam splitter, the interstitial display including a camera positioned with respect to the beam splitter to capture images through the beam splitter, the interstitial display to display a sub-image in context with the main image;
a display controller to adjust the sub-image independent of the main image;
a display driver to independently drive pixels of the interstitial display and pixels of the main display panel according to sub-image and main image, respectively; and
a display interface connecting the display driver to the display controller.

11. The computing device of claim 10, wherein the computing device is to deactivate a pixel of the interstitial display when the camera is active and further is to activate the pixel of the interstitial display when the camera is not active.

12. A display device comprising:
a display panel, the display panel including an array of pixels and an opening within the array of pixels;
a plurality of beam splitters positioned to communicate light through the opening within the array of pixels;

a front-facing camera positioned with respect to the plurality of beam splitters to capture light incident on the opening within the array of pixels; and
a plurality of pixels positioned with respect to the plurality of beam splitters to output light through the opening within the array of pixels.

\* \* \* \* \*